United States Patent
Nasu et al.

(10) Patent No.: US 11,713,072 B2
(45) Date of Patent: Aug. 1, 2023

(54) STEERING KNUCKLE

(71) Applicant: Honda Motor Co., Ltd., Tokyo (JP)

(72) Inventors: Kenichi Nasu, Tokyo (JP); Koji Takami, Tokyo (JP); Kenichi Hibino, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/835,892

(22) Filed: Jun. 8, 2022

(65) Prior Publication Data

US 2023/0067772 A1 Mar. 2, 2023

(30) Foreign Application Priority Data

Aug. 30, 2021 (CN) .......................... 202122066512.6

(51) Int. Cl.
  *B62D 7/18* (2006.01)
  *B60G 13/00* (2006.01)

(52) U.S. Cl.
  CPC ............. *B62D 7/18* (2013.01); *B60G 13/006* (2013.01); *B60G 2204/129* (2013.01)

(58) Field of Classification Search
  CPC .... B62D 7/18; B60G 2204/12; B60G 13/006; B60G 2206/50
  See application file for complete search history.

(56) References Cited

U.S. PATENT DOCUMENTS

| | | | | |
|---|---|---|---|---|
| 4,420,272 A | * | 12/1983 | Ingalls | B62D 17/00 403/162 |
| 11,131,337 B1 | * | 9/2021 | Miller | F16C 11/0604 |
| 2012/0049477 A1 | * | 3/2012 | Webster | B22D 18/04 164/63 |
| 2014/0306412 A1 | * | 10/2014 | van der Jagt | B62D 7/18 280/93.508 |
| 2022/0081031 A1 | * | 3/2022 | Kim | B62D 7/06 |

(Continued)

FOREIGN PATENT DOCUMENTS

| | | | | |
|---|---|---|---|---|
| CN | 113002260 A | * | 6/2021 | |
| CN | 113511262 A | * | 10/2021 | |
| DE | 10212873 A1 | * | 10/2003 | ........... B60G 13/006 |

(Continued)

OTHER PUBLICATIONS

Mueller, Pivot Bearing For Wheel Suspension Has First Curved Rib Extending From Spring Strut Connection To Wheel Bearing Connection . . . , Oct. 2, 2003, EPO, DE 10212873 A1, Machine Translation of Description (Year: 2003).*

*Primary Examiner* — Drew J Brown
*Assistant Examiner* — Matthew D Lee
(74) *Attorney, Agent, or Firm* — JCIPRNET

(57) ABSTRACT

The disclosure provides a steering knuckle, which has good rigidity and reliability. The steering knuckle includes: a wheel support portion for supporting a wheel; a damper support portion for supporting a damper; and an arm portion for connecting the wheel support portion and the damper support portion. The damper support portion is cylindrical and has a mounting hole through which the damper is inserted, and the arm portion includes a pair of side walls connecting the damper support portion and the wheel support portion and a bottom wall connected between the side walls, and the bottom wall is connected with the side walls at the middle portion in the vertical direction of the side walls.

2 Claims, 4 Drawing Sheets

(56) References Cited

U.S. PATENT DOCUMENTS

2022/0161847 A1* 5/2022 Anang ................ B60G 13/005

FOREIGN PATENT DOCUMENTS

| DE | 102010023231 A1 * | 6/2011 | ............... B62D 7/18 |
| DE | 102013206834 A1 * | 10/2014 | ............. B60G 15/07 |
| DE | 102014205384 A1 * | 9/2015 | ........... B60G 15/068 |
| EP | 1314630 A2 * | 5/2003 | ........... B60G 13/006 |
| JP | 2000304084 | 10/2000 | |

* cited by examiner

STEERING KNUCKLE

CROSS-REFERENCE TO RELATED APPLICATION

This application claims the priority benefit of China application no. 202122066512.6, filed on Aug. 30, 2021. The entirety of the above-mentioned patent application is hereby incorporated by reference herein and made a part of this specification.

BACKGROUND

Technical Field

The disclosure relates to a steering knuckle.

Description of Related Art

Reference document 1 (JP Laid-Open 2000-304084) discloses a damping shock absorber attached to a fastening hole provided at an end portion of a bracket of a steering knuckle, and a slit is provided on the outer side of the fastening hole. The shock absorber is tightened by clamping a tongue piece with a bolt. Also, in the steering knuckle disclosed in the reference document 1, a hollow tubular cylindrical boss is formed around the fastening hole in which the damping shock absorber is arranged, and the steering knuckle is connected to the boss with an arm portion having a U-shaped cross section.

Under the circumstances, however, the vertical load of the arm portion on the boss will cause stress in two positions around the boss, one is on the inside of the bottom where the arm portion is connected to the cylindrical boss, and the other is a portion where the cylindrical boss connects the arm portion and the inner portion of the center of the tubular side wall between the outer slit. Moreover, it is difficult to control which part of the two is the stress concentration point that is prone to fracture. Therefore, the overall rigidity of the steering knuckle needs to be improved, resulting in an increase in the weight of the structure.

SUMMARY

The disclosure provides a steering knuckle, which has good rigidity and reliability.

The disclosure provides a steering knuckle, including: a wheel support portion for supporting the wheel; a damper support portion for supporting the damper; and an arm portion for connecting the wheel support portion and the damper support portion. The damper support portion is cylindrical and has a mounting hole through which the damper is inserted. The arm portion includes a pair of side walls connecting the damper support portion and the wheel support portion and a bottom wall connected to the side walls, and the bottom wall is connected with the side walls in the middle portion of the vertical direction of the side walls.

In an embodiment of the present disclosure, the bottom wall is connected to the lower end of the damper support portion, and the side wall extends to a position lower than the lower end of the damper support portion.

In an embodiment of the present disclosure, the lower end of the damper support portion includes an inclined portion. The inclined portion is inclined upward as the distance from the wheel support portion increases, and the inclined portion is inclined in the manner of extending along the extending line of the lower end of the side wall.

In an embodiment of the present disclosure, the center of the mounting hole is located in a direction farther from the wheel support portion than the center of the damper support portion.

Based on the above, in the steering knuckle of the present disclosure, through the structure in which the pair of side walls of the arm portion and the bottom wall are connected at the middle portion in the vertical direction of the side walls, the stress may be concentrated at a position where the arm portion and the damper support portion are connected. Moreover, the reliability of the product may be enhanced through improving the rigidity design of the relevant portions.

In order to make the above-mentioned features and advantages of the present disclosure more comprehensible, the following embodiments are given and described in detail with the accompanying drawings as follows.

DESCRIPTION OF THE EMBODIMENTS

Figure 1:
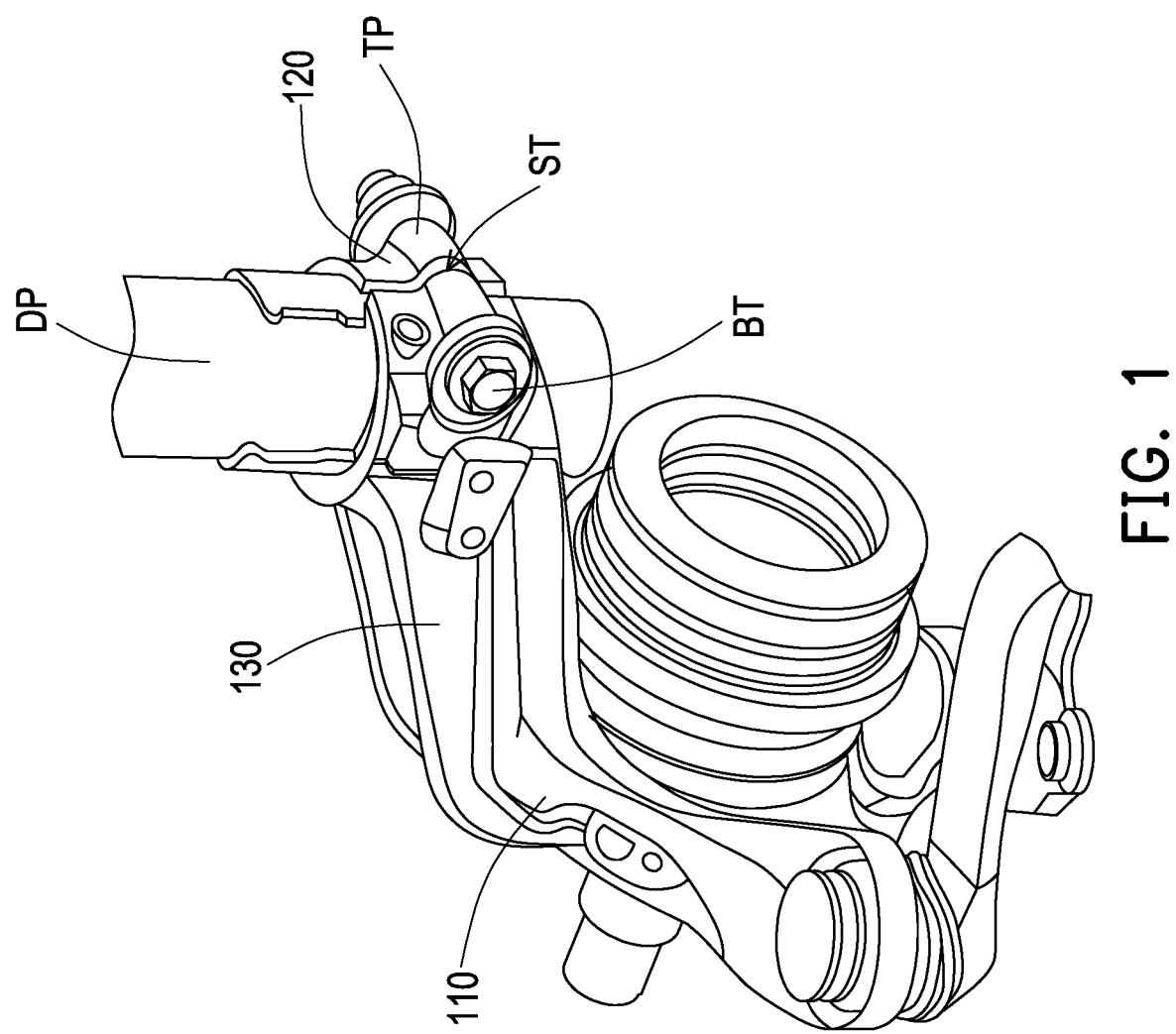
FIG. 1 is a schematic structural view of a steering knuckle according to an embodiment of the present disclosure.
Figure 2:
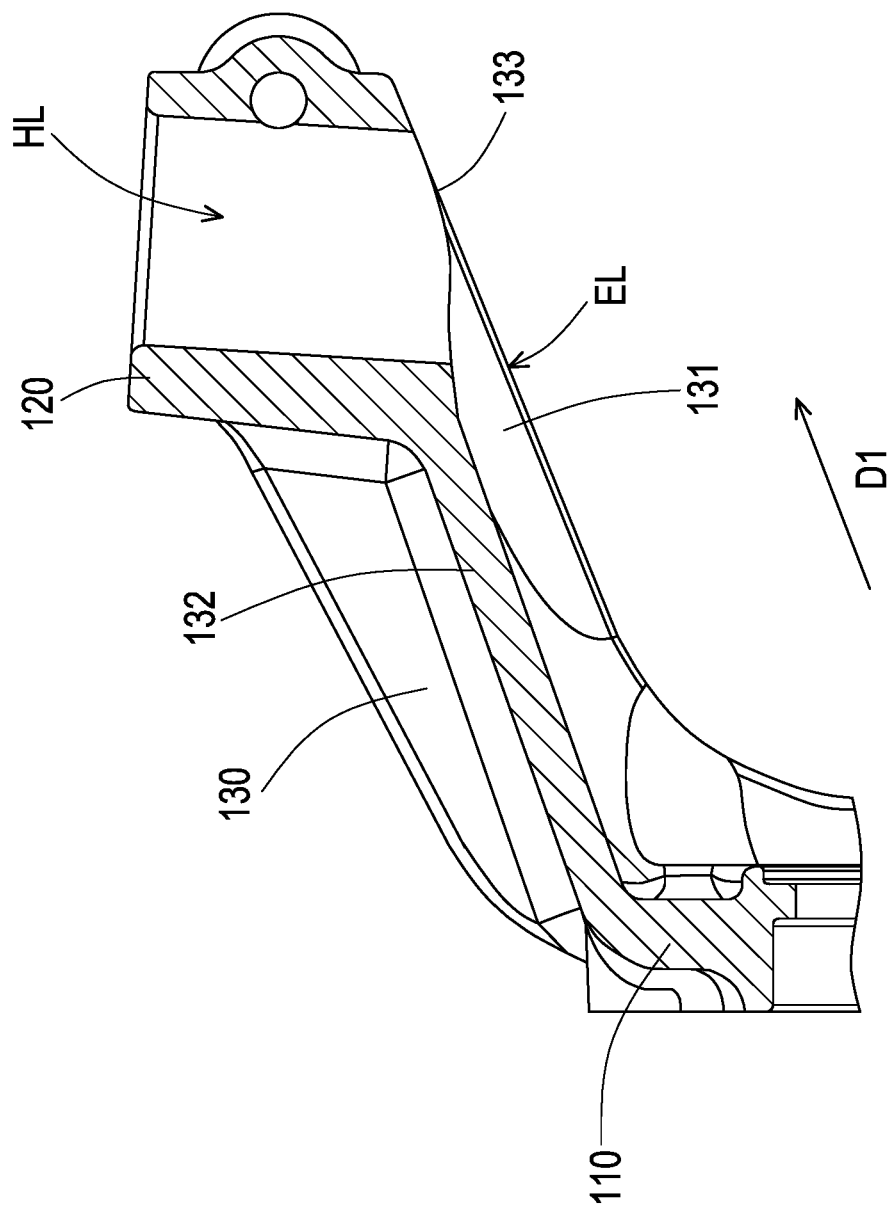
FIG. 2 is a schematic cross-sectional structural view of the steering knuckle shown in FIG. 1 on a cross section parallel to the extending direction of the arm portion.
Figure 3:
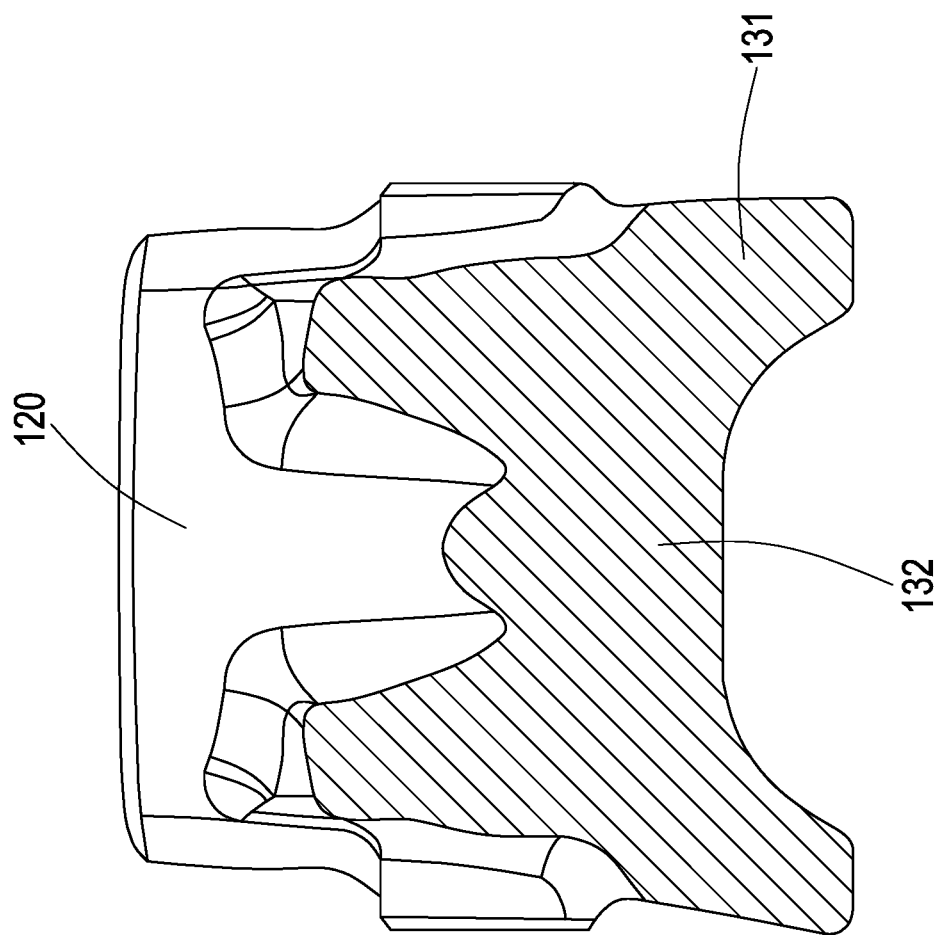
FIG. 3 is a schematic cross-sectional structural view of the arm portion of the steering knuckle shown in FIG. 1 on a cross section orthogonal to an extending direction thereof.
Figure 4:
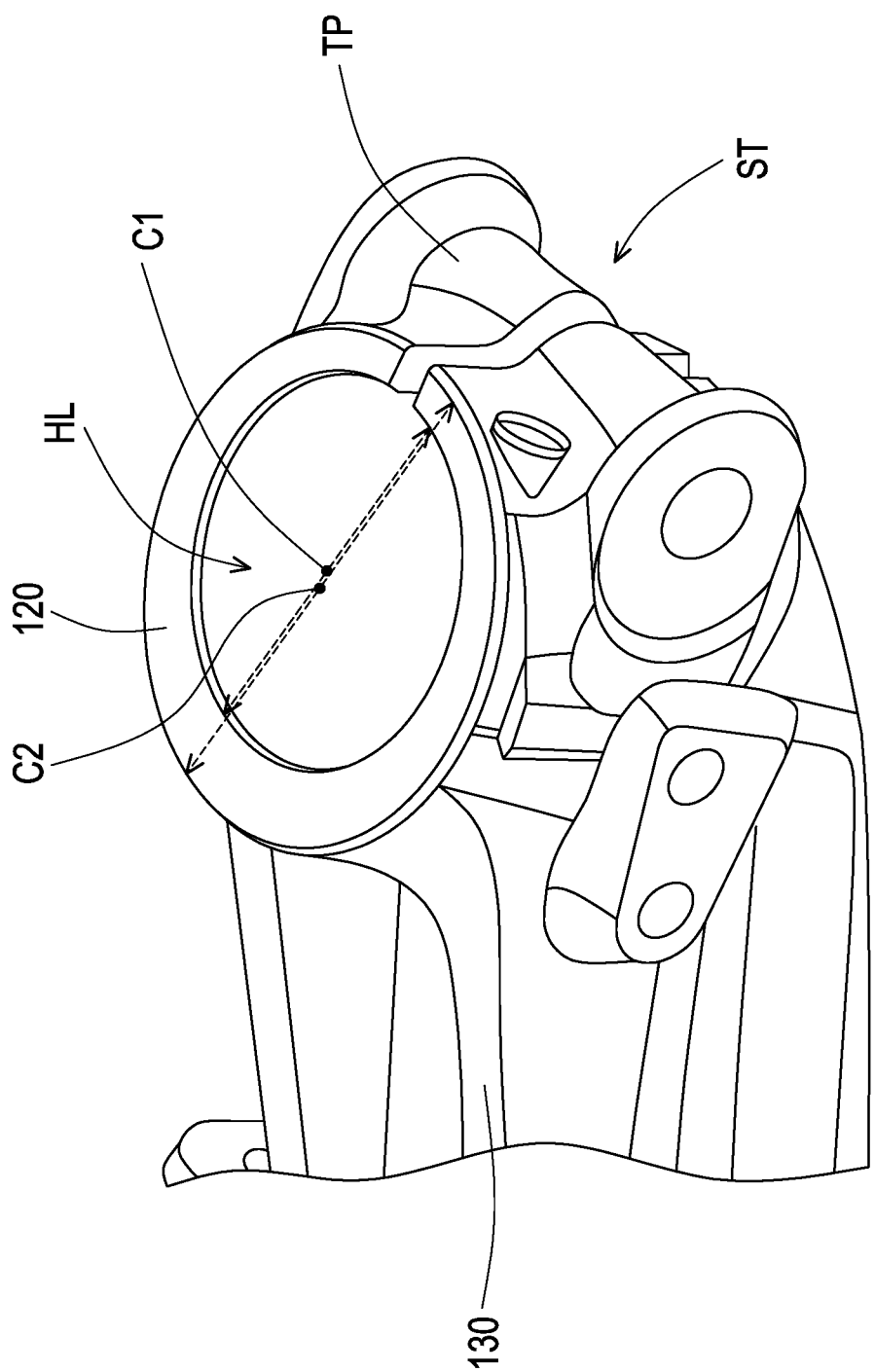
FIG. 4 is a schematic top view of the damper support portion shown in FIG. 1.

FIG. 1 is a schematic structural view of a steering knuckle according to an embodiment of the present disclosure. FIG. 2 is a schematic cross-sectional structural view of the steering knuckle shown in FIG. 1 on a cross section parallel to the extending direction of the arm portion. FIG. 3 is a schematic cross-sectional structural view of the arm portion of the steering knuckle shown in FIG. 1 on a cross section orthogonal to an extending direction thereof. FIG. 4 is a schematic top view of the damper support portion shown in FIG. 1. The specific structure of the steering knuckle 100 will be described below with reference to FIG. 1 to FIG. 4.

Referring to FIG. 1, in this embodiment, the steering knuckle 100 includes: a wheel support portion 110, a damper support portion 120 and an arm portion 130. The wheel support portion 110 is configured to support the wheel. The damper support portion 120 is configured to support the damper DP. As shown in FIG. 1 and FIG. 2, the damper support portion 120 is cylindrical and has a mounting hole HL through which the damper DP is inserted. On the other hand, the arm portion 130 is configured to connect the wheel support portion 110 and the damper support portion 120. As shown in FIG. 2 and FIG. 3, the arm portion 130 includes a pair of side walls 131 connecting the damper support portion 120 and the wheel support portion 110 and a bottom wall 132 connected to the side walls 131. As shown in FIG. 2, the bottom wall 132 is connected to the side walls 131 at the middle portion in the vertical direction of the side walls 131. Furthermore, as shown in FIG. 2 and FIG. 3, the arm portion 130 of the steering knuckle 100 is formed in an H-shaped cross-section in a cross section orthogonal to the extending direction D1 thereof.

In this manner, through the structure in which the pair of side walls 131 of the arm portion 130 and the bottom wall are connected at the middle portion in the vertical direction of the side walls 131, the stress may be concentrated at a position where the arm portion 130 and the damper support portion 130 are connected. Moreover, the reliability of the product may be enhanced through improving the rigidity design of the relevant portions.

Furthermore, as shown in FIG. 2, in the present embodiment, the bottom wall 132 of the arm portion 130 is connected to the lower end of the damper support portion 120, and the side wall 131 extends to a position lower than the lower end of the damper support portion 120. In this way, during the molding process, since the molding die may be pulled out from the wheel support portion 110 side toward the damper support portion 120 side, a slider is not required, and the moldability is improved. In addition, as shown in FIG. 2, in the present embodiment, the lower end of the damper support portion 120 includes an inclined portion 133 which is inclined upward as the distance from the wheel support portion 110 increases, and the inclined portion 133 is inclined in the manner of extending along the extending line EL of the lower end of the side wall 131. In this way, since the lower end of the side wall 131 and the inclined portion 133 are arranged on a substantially straight line, the maximum length that does not interfere with the punching of the side wall 131 can be ensured. In this manner, the structure of the arm portion 130 may be easily formed.

On the other hand, as shown in FIG. 2 and FIG. 4, in the present embodiment, a slit ST is provided on the outer side of the mounting hole HL of the damper support portion 120, which may fasten the damper DP through clamping the tongue piece TP with the clamping bolt BT. Furthermore, the center C1 of the mounting hole HL is located in a direction farther from the wheel support portion 110 than the center C2 of the damper support portion 120, that is, the mounting hole HL is eccentric outward. In this way, when the damper DP is clamped, one side of the damper support portion 120 close to the slit ST is more likely to deform than one side close to the arm portion 130 and the wheel support portion 110. Therefore, since the mounting hole HL is eccentric outward, the adverse effect caused by the damper DP on one side close to the wheel support portion 110 may be suppressed, so it is possible to inhibit the boss on the outer side of the mounting hole HL of the damper support portion 120 from deforming into an elliptical shape, and the damper DP may be reliably supported. Also, since the rigidity of the damper support portion 120 may be changed by a simple method of moving the center of the mounting hole HL when the mounting hole HL is processed, the structural design of the damper support portion 120 may be simplified.

In summary, in the steering knuckle of the present disclosure, through the structure in which the pair of side walls of the arm portion and the bottom wall are connected at the middle portion in the vertical direction of the side walls, the stress may be concentrated at a position where the arm portion and the damper support portion are connected. Moreover, the reliability of the product may be enhanced through improving the rigidity design of the relevant portions.

Finally, it should be noted that the above embodiments are only used to illustrate the technical solutions of the present disclosure, but not to limit them. Although the present disclosure has been described in detail with reference to the foregoing embodiments, those of ordinary skill in the art should understand that the technical solutions described in the foregoing embodiments can still be modified, or some or all of the technical features thereof can be equivalently replaced; and these modifications or replacements do not make the essence of the corresponding technical solutions deviate from the technical solutions of the embodiments of the present disclosure.

What is claimed is:

1. A steering knuckle, comprising:
   a wheel support portion, configured for supporting a wheel;
   a damper support portion, configured for supporting a damper; and
   an arm portion, configured for connecting the wheel support portion and the damper support portion, wherein
   the damper support portion is cylindrical and has a mounting hole through which the damper is inserted,
   the arm portion comprises a pair of side walls connecting the damper support portion and the wheel support portion and a bottom wall connected to the side walls, and the bottom wall is connected with the side walls in a middle portion of a vertical direction of the side walls, and the lower end of the damper support portion comprises an inclined portion, the inclined portion is inclined upward as a distance from the wheel support portion increases, and the inclined portion is inclined in a manner of extending along an extending line of a lower end of the side wall.

2. The steering knuckle according to claim 1, wherein a center of the mounting hole is located in a direction farther from the wheel support portion than a center of the damper support portion.

\* \* \* \* \*